US009581788B2

(12) United States Patent
Suzuki

(10) Patent No.: US 9,581,788 B2
(45) Date of Patent: Feb. 28, 2017

(54) LENS SYSTEM AND IMAGE CAPTURING SYSTEM INCLUDING THE SAME

(71) Applicant: CANON KABUSHIKI KAISHA, Tokyo (JP)

(72) Inventor: Junichi Suzuki, Utsunomiya (JP)

(73) Assignee: Canon Kabushiki Kaisha, Tokyo (JP)

(*) Notice: Subject to any disclaimer, the term of this patent is extended or adjusted under 35 U.S.C. 154(b) by 120 days.

(21) Appl. No.: 14/677,642

(22) Filed: Apr. 2, 2015

(65) Prior Publication Data

US 2015/0286034 A1    Oct. 8, 2015

(30) Foreign Application Priority Data

Apr. 4, 2014 (JP) ................. 2014-077896

(51) Int. Cl.
| | | |
|---|---|---|
| G02B 13/00 | (2006.01) | |
| H04N 5/225 | (2006.01) | |
| H04N 5/376 | (2011.01) | |
| G03B 13/34 | (2006.01) | |
| G03B 3/10 | (2006.01) | |
| G03B 5/00 | (2006.01) | |
| H04N 5/232 | (2006.01) | |

(52) U.S. Cl.
CPC .............. *G02B 13/0015* (2013.01); *G03B 3/10* (2013.01); *G03B 5/00* (2013.01); *H04N 5/2254* (2013.01); *H04N 5/23209* (2013.01); *G03B 2205/0046* (2013.01); *G03B 2205/0053* (2013.01)

(58) Field of Classification Search
None
See application file for complete search history.

(56) References Cited

U.S. PATENT DOCUMENTS

| | | | | |
|---|---|---|---|---|
| 6,753,918 B1* | 6/2004 | Kanayama | ......... | H04N 5/23209 348/335 |
| 6,867,809 B1* | 3/2005 | Suzuki | ............... | H04N 5/23296 348/347 |
| 7,092,027 B1* | 8/2006 | Mizumura | ............... | G02B 7/10 348/229.1 |
| 2009/0278976 A1* | 11/2009 | Shibata | .................. | G02B 7/102 348/335 |
| 2015/0286034 A1* | 10/2015 | Suzuki | ............... | G02B 13/0015 348/294 |

FOREIGN PATENT DOCUMENTS

| | | |
|---|---|---|
| JP | 2000-307925 A | 11/2000 |
| JP | 2008-252348 A | 10/2008 |
| JP | 2013-125170 A | 6/2013 |
| JP | 2013-222985 A | 10/2013 |
| JP | 2013-254138 A | 12/2013 |

* cited by examiner

*Primary Examiner* — W B Perkey
(74) *Attorney, Agent, or Firm* — Canon USA Inc., IP Division

(57) ABSTRACT

A lens system includes a lens device including an optical member, and a position detection device including a detection unit that obtains position information regarding the optical member. The position detection device includes a generation unit that generates a connection request signal for requesting the lens device to establish a first communication path between the lens device and the position detection device. The generation unit includes, in the connection request signal, the position information obtained by the detection unit.

11 Claims, 10 Drawing Sheets

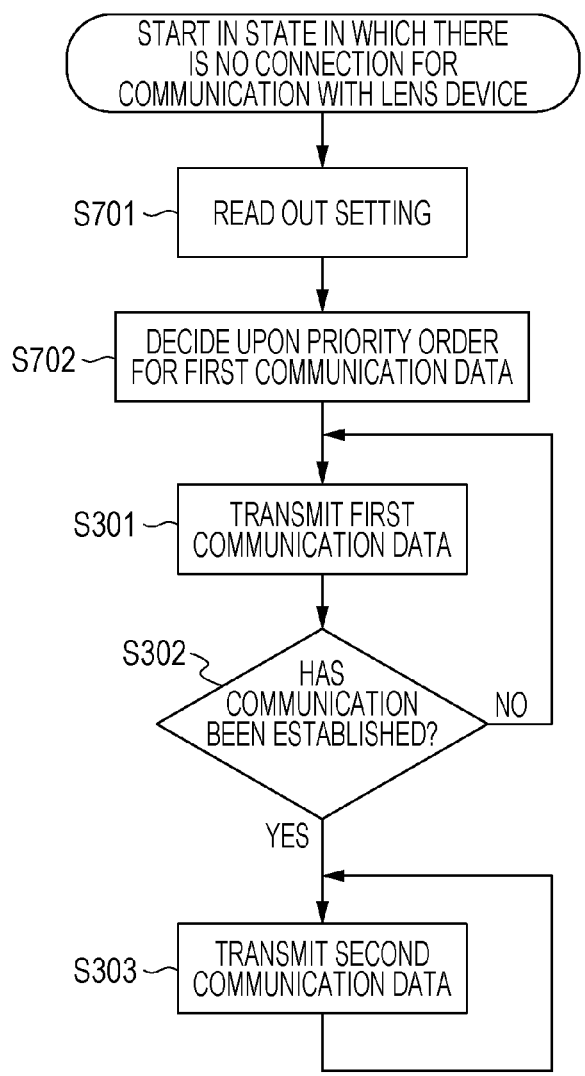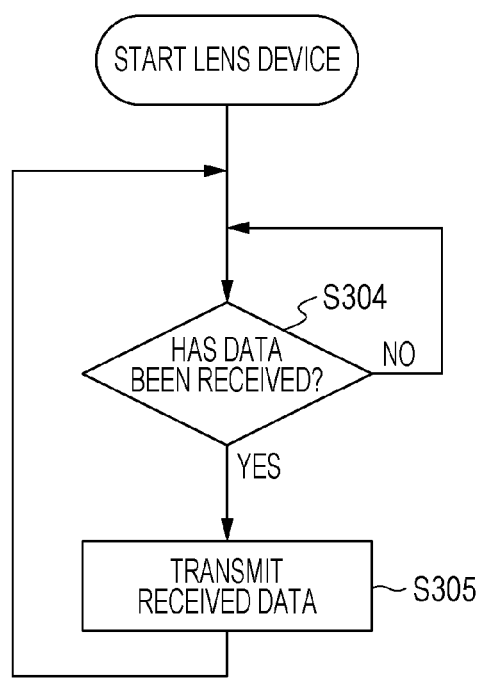
FIG. 7A
FIG. 7B

LENS SYSTEM AND IMAGE CAPTURING SYSTEM INCLUDING THE SAME

BACKGROUND OF THE INVENTION

Field of the Invention

The present invention relates to a lens system and an image capturing system including the lens system.

Description of the Related Art

Image capturing systems used for capturing images for television (referred to also as "TV lens system" below) include a television camera (simply referred to also as "camera device" below) and a TV lens (simply referred to also as "lens system" below).

A TV lens mainly includes a lens device and a drive unit. The lens device includes an image-capturing optical system and a manual adjustment ring for operating the image-capturing optical system.

The drive unit includes therein components such as a motor and a control board for electrically driving the manual adjustment ring, a central processing unit (CPU), and a position detection sensor. With this configuration, the TV lens system can perform high-precision position detection, and electric drive with high operability can be realized.

Meanwhile, image capturing systems for film, commercial, and drama productions (referred to also as "cinema lens systems" below) are known. Recent cinema lens systems, in which a drive unit is connected to a lens device as in TV lens systems, have operability equivalent to that of TV lens systems.

Camera devices included in some cinema lens systems have both a still-image capturing mode and a moving-image capturing mode. Especially in the still-image capturing mode, it is desired in some situations to capture an image immediately after the lens device is started. In view of such a situation, the time required from when the lens device is started to when the camera device is ready to start capturing an image is preset at an extremely short time so that users do not become stressed. In the following description, the time required from when the lens device is started to when the camera device is ready to start capturing an image is referred to also as "camera image-capturing start period."

Some image capturing systems have a function of turning off functions of the lens device (referred to also as "low-power-consumption state" below) when no operation has been made in a certain period of time. Accordingly, the lens device of such image capturing systems is started from the low-power-consumption state or from the power-off state.

The camera device, for example, displays the lens position on the viewfinder (VF) and adjusts the light amount and the like on the basis of the lens position. To enable these operations, the lens device needs to output (transmit) the lens position to the camera device after the lens device has been started from the power-off state and before the end of the camera image-capturing start period.

Some patent documents disclose techniques for reducing the time required to reach an image-capturing ready state from system start.

For example, Japanese Patent Laid-Open No. 2008-252348 discloses a technique for driving a zoom lens to set a focal length at a predetermined length when a camera is turned on.

Japanese Patent Laid-Open No. 2000-307925 discloses a technique for outputting data in high-speed processing in communications between a camera device and a lens device even when no command is input.

However, the following problem arises. The lens device outputs, to the camera device, information on a lens position that is input by a drive unit (referred to also as "position detection device" below) including a position detection sensor. However, the lens device cannot output the lens position information to the camera device before the end of the camera image-capturing start period if the lens device needs to wait for the establishment of communication between the lens device and the position detection device (first communication path).

According to the known technique disclosed in Japanese Patent Laid-Open No. 2008-252348 above, the zoom lens needs to be driven first, which takes longer than the camera image-capturing start period.

According to the known technique disclosed in Japanese Patent Laid-Open No. 2000-307925 above, when communication between the camera device and the lens device has been established and communication (communication path) between the position detection device and the lens device has not been established, the lens device cannot output position information in the period from when the lens device is started to the end of the camera image-capturing start period. In an alternative method, a lens device including a position detection sensor outputs position information obtained by the lens device to the camera device. However, to enable this method, the position detection sensor needs to be included in the lens device, which increases the cost and the size of the lens device.

SUMMARY OF THE INVENTION

In view of these circumstances, an aspect of the present invention provides a lens system and an image capturing system that are capable of promptly obtaining position information regarding an optical member after a lens device has been started.

An aspect of the present invention provides a lens system including a lens device including an optical member, and a position detection device including a detection unit that obtains position information regarding the optical member. The position detection device includes a generation unit that generates a connection request signal for requesting the lens device to establish a first communication path between the lens device and the position detection device. The generation unit includes, in the connection request signal, the position information obtained by the detection unit.

Further features of the present invention will become apparent from the following description of exemplary embodiments with reference to the attached drawings.

BRIEF DESCRIPTION OF THE DRAWINGS

FIGS. 7A and 7B are respectively a flowchart related to a position detection device and a flowchart related to a lens device of the third embodiment (when the lens device is turned on).

DESCRIPTION OF THE EMBODIMENTS

Figure 1:
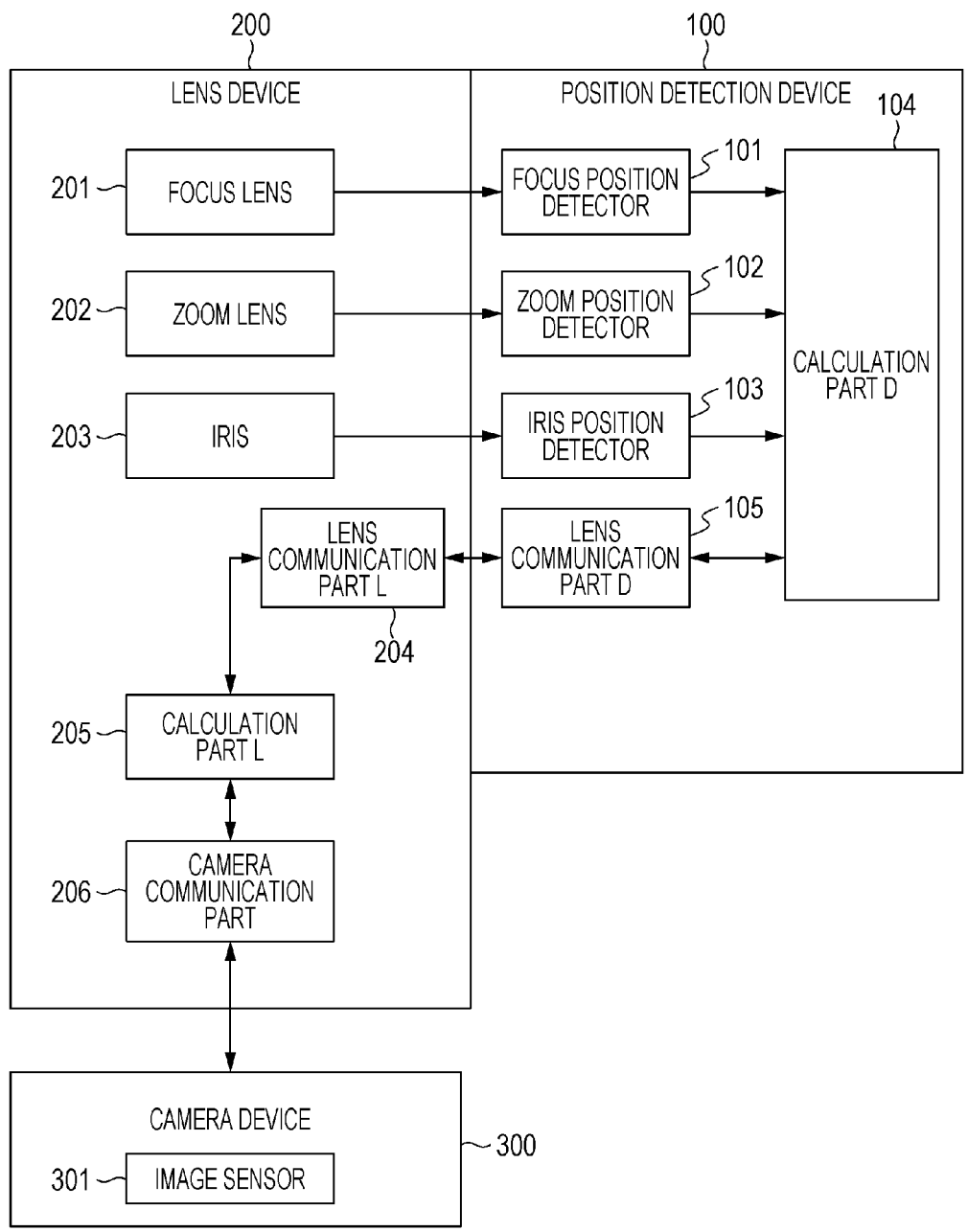
FIG. 1 is a block diagram illustrating a configuration according to a first embodiment.

Exemplary embodiments of the present invention are described below in detail on the basis of the accompanying drawings. FIG. 1 is a block diagram illustrating a configuration related to embodiments of the present invention.

First Embodiment

An image capturing system according to a first embodiment of the present invention is described below with reference to FIGS. 1, 2, 3A, and 3B.

FIG. 1 is a functional block diagram of the image capturing system of this embodiment. In FIG. 1, the image capturing system includes a drive unit (position detection device) 100, a lens device 200, and a camera device 300. The drive unit 100 is referred to as a position detection device 100 below.

The position detection device 100 mainly includes a focus position detector (detection unit) 101, a zoom position detector (detection unit) 102, an iris position detector (detection unit) 103, a calculation part D (generation unit) 104, and a lens communication part D (output unit) 105.

The lens device 200 includes a focus lens (optical member) 201, a zoom lens (optical member) 202, an iris (optical member) 203, a lens communication part L 204, a calculation part L 205, and a camera communication part 206.

The camera device 300 includes an image sensor 301, which photoelectrically converts an optical image formed by the optical member of the lens device 200.

The focus lens 201 changes an object distance, the zoom lens 202 changes a focal length, and the iris 203 regulates the amount of light. The focus lens 201 is connected to the focus position detector 101 via an unillustrated focus gear and outputs (transmits) a position signal to the calculation part D 104 when the focus lens 201 is driven.

Similarly, the zoom position detector 102 outputs position information (position signal) to the calculation part D 104 when the zoom lens 202 is driven, and the iris position detector 103 outputs position information (position signal) to the calculation part D 104 when the iris 203 is driven. The calculation part D 104 generates first communication data to be described later, as a connection request signal on the basis of the input position information (position signals) as appropriate.

In this embodiment, an encoder is used for the focus position detector 101, the zoom position detector 102, and the iris position detector 103. However, a potentiometer may be used instead.

The calculation part D 104 outputs the communication data to the lens communication part D 105 and receives communication data from the lens communication part D 105.

The lens communication part D 105 outputs the communication data input by the calculation part D 104, to the lens device 200. The lens communication part D 105 outputs communication data input by (received from) the lens device 200, to the calculation part D 104.

The lens communication part L 204 outputs the communication data input by the position detection device 100, to the calculation part L 205. The lens communication part L 204 outputs communication data input by the calculation part L 205, to the position detection device 100.

The calculation part L 205 outputs the communication data input by the lens communication part L 204, to the camera communication part 206 and outputs communication data input by the camera communication part 206, to the lens communication part L 204.

The camera communication part 206 outputs the communication data input by the calculation part L 205, to the camera device 300. The camera communication part 206 outputs communication data input by the camera device 300, to the calculation part L 205.

The camera device 300 is an imaging device.

Figure 2:
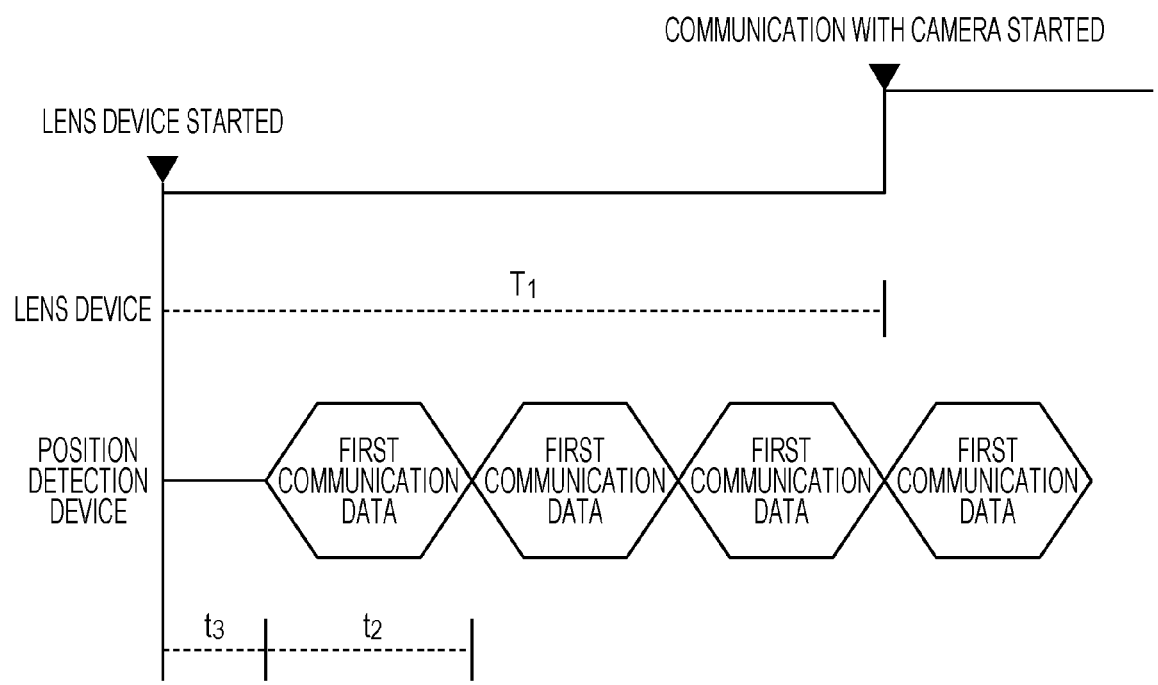
FIG. 2 is a timing chart used in embodiments of the present invention.

FIG. 2 is a timing chart of the time period from when the lens device 200 is started to when the camera device 300 is ready to start capturing an image. In FIG. 2, $T_1$ represents the time period required from when the lens device 200 is started to when the camera device 300 is ready to start capturing an image.

The time period $T_1$ corresponds also to the time period required from when the lens device 200 is started to when a communication path between the lens device 200 and the camera device 300 (second communication path) is established. The time period $T_1$ is preset at an extremely short time so that users do not become stressed. Although the time period $T_1$ is set at 10 msec in this embodiment, the length is not limited to this.

The position detection device 100 outputs first communication data to the lens device 200 after the lens device 200 has been started and before the time period $T_1$ elapses. In FIG. 1, $t_2$ represents the time period in which the lens communication part D 105 outputs the first communication data to the lens device 200. The time periods $t_2$ and $T_1$ have the following relationship: $t_2 < T_1$, that is, the time period $t_2$ is shorter than the time period $T_1$.

In FIG. 1, a time period $t_3$ and the time period $t_2$ have the following relationship: $t_3 < t_2$, that is, the time period $t_3$ is shorter than the time period $t_2$. This relationship is described in detail in a second embodiment. The first communication data in this embodiment is a connection request signal with which the position detection device 100 requests to establish a communication path with the lens device 200 (first communication path).

The first communication data includes position data (referred to also as "lens position data" below) indicating position information regarding each of the focus lens 201, the zoom lens 202, and the iris 203, as an example.

The position information regarding the focus lens 201 is information on the optical-axis-direction position of the focus lens. The position information regarding the zoom lens 202 is information on the optical-axis-direction position of the zoom lens. The position information regarding the iris 203 is information on the position of the iris diaphragm blades.

Figure 3A:
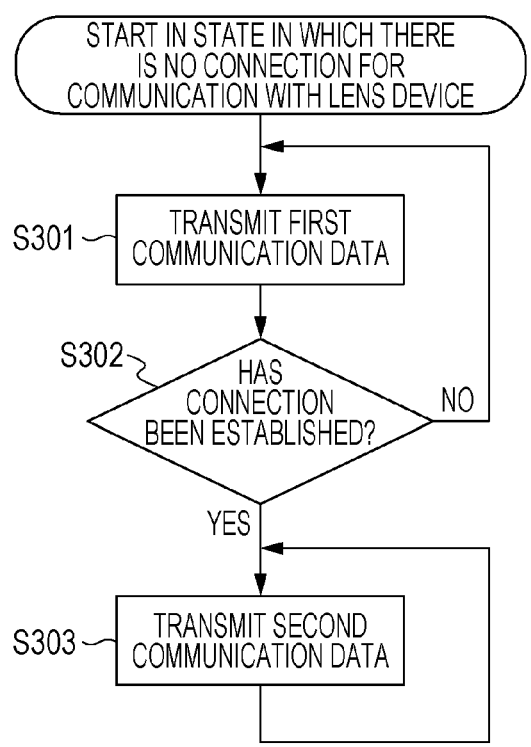
FIGS. 3A and 3B are respectively a flowchart related to a position detection device and a flowchart related to a lens device of the first embodiment (when the lens device is turned on).
Figure 3B:
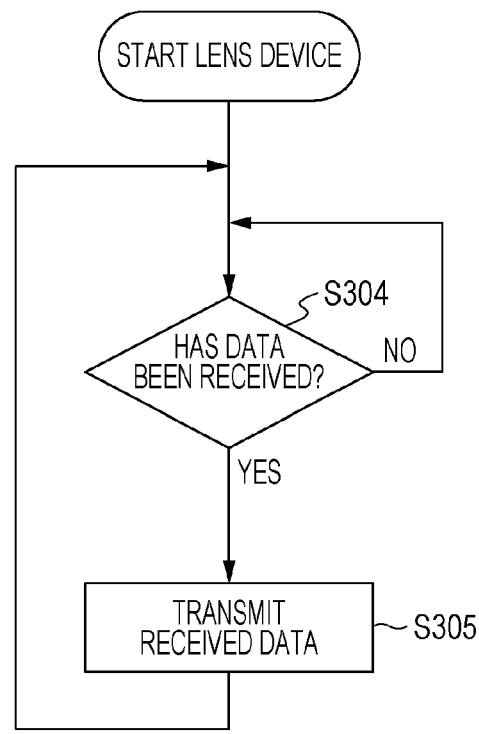

FIGS. 3A and 3B are flowcharts of communication processes of this embodiment carried out by the position detection device 100 and the lens device 200 when the lens device 200 is turned on. FIG. 3A illustrates the communication process by the position detection device 100. FIG. 3B illustrates the communication process by the lens device 200. In this embodiment, the lens device 200 is assumed to be in a low-power-consumption state (state in which the power consumption is low).

First, a description is given with reference to FIG. 3A.

The position detection device 100 proceeds to step S301 when a connection for communication with the lens device 200 is not established. In step S301, the position detection device 100 outputs first communication data to the lens device 200 and proceeds to step S302.

In step S302, the position detection device 100 determines whether communication with the lens device 200 (first communication path) has been established. In the case where the communication (first communication path) has been established, the position detection device 100 proceeds to step S303; otherwise, the position detection device 100 returns to step S301.

In step S303, the position detection device 100 outputs second communication data to the lens device 200 and repeats step S303.

Next, a description is given with reference to FIG. 3B.

The lens device 200 proceeds to step S304 after being started.

In step S304, the lens device 200 determines whether data has been input by the position detection device 100 after the lens device 200 has been started. In the case where data has been input, the lens device 200 proceeds to step S305; otherwise, the lens device 200 repeats step S304.

In step S305, the lens device 200 outputs the data that is detected in S304 to the camera device 300 and returns to step S304.

Through these operations, the position detection device 100 can regularly output position information (position data) to the lens device 200 from when the lens device 200 is started and before the communication path between the lens device 200 and the position detection device 100 (first communication path) is established. This enables the lens device 200 to promptly output the position data to the camera device 300 after the lens device 200 has been started.

Accordingly, the lens position is input to the camera device 300 before the end of the camera image-capturing start period and is hence able to display the lens position in the VF and make various adjustments on the basis of the lens position. This enables the camera device 300 to quickly reach the state of being able to start capturing an image after the lens device 200 has been started.

In this embodiment, a description is given assuming the case in which the lens device 200 is started from the low-power-consumption state. However, the application of this embodiment is not limited to this; this embodiment may be applied to a case in which the lens device 200 is started by turning on the lens device 200 or when the lens device 200 is started from a state where a different function is turned off.

In this embodiment, the first communication data includes lens position data. However, the first communication data may include information that is not held by the lens device 200 but is held by the position device 100 and that is needed by the lens device 200 immediately after the lens device 200 is started, in addition to the lens position data.

For example, the first communication data may include information that is not held by the lens device 200 but is held by the position detection device 100 and that needs to be adjusted by the camera device 300, or static information (such as a serial number) held by the position detection device 100. Alternatively, the position detection device 100 may further include drivers that drive the focus lens, the zoom lens, and the iris, and the focus lens, the zoom lens, and the iris may be driven via an unillustrated operation unit.

This embodiment can provide such an image capturing system, in which the lens system can promptly output position information (position data) to the camera device 300 after the lens device 200 has been started.

Second Embodiment

An image capturing system according to a second embodiment of the present invention is described below with reference to FIGS. 2, 3B, 4, and 5.

The same functional components as those of the first embodiment are denoted by the same numerals, and the description thereof is omitted. In this embodiment, the position detection device 100 is assumed to be turned off.

In FIG. 2, $t_3$ represents a time period in which the lens device 200 is on standby until position data is input to the lens device 200 by the position detection device 100 after the lens device 200 has been started. The time periods $t_3$ and $t_2$ have the following relationship: $t_3 < t_2$.

Figure 4:
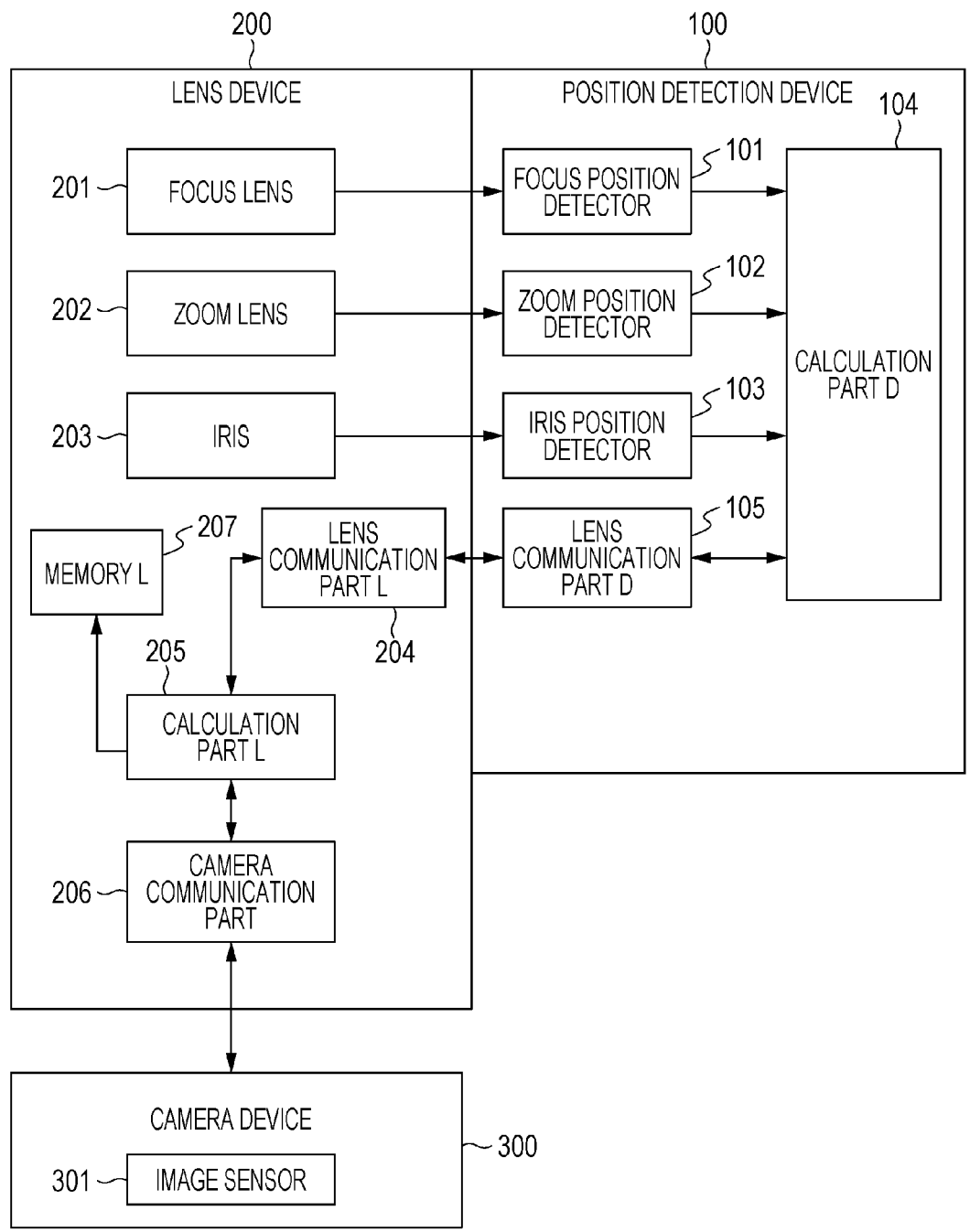
FIG. 4 is a block diagram illustrating a configuration according to a second embodiment.

FIG. 4 is a functional block diagram of the image capturing system of this embodiment. FIG. 4 is different from FIG. 1 used in the first embodiment in that the lens device 200 further includes a memory L 207.

The memory L 207 is a nonvolatile memory and stores data on a given lens position in advance.

Figure 5:
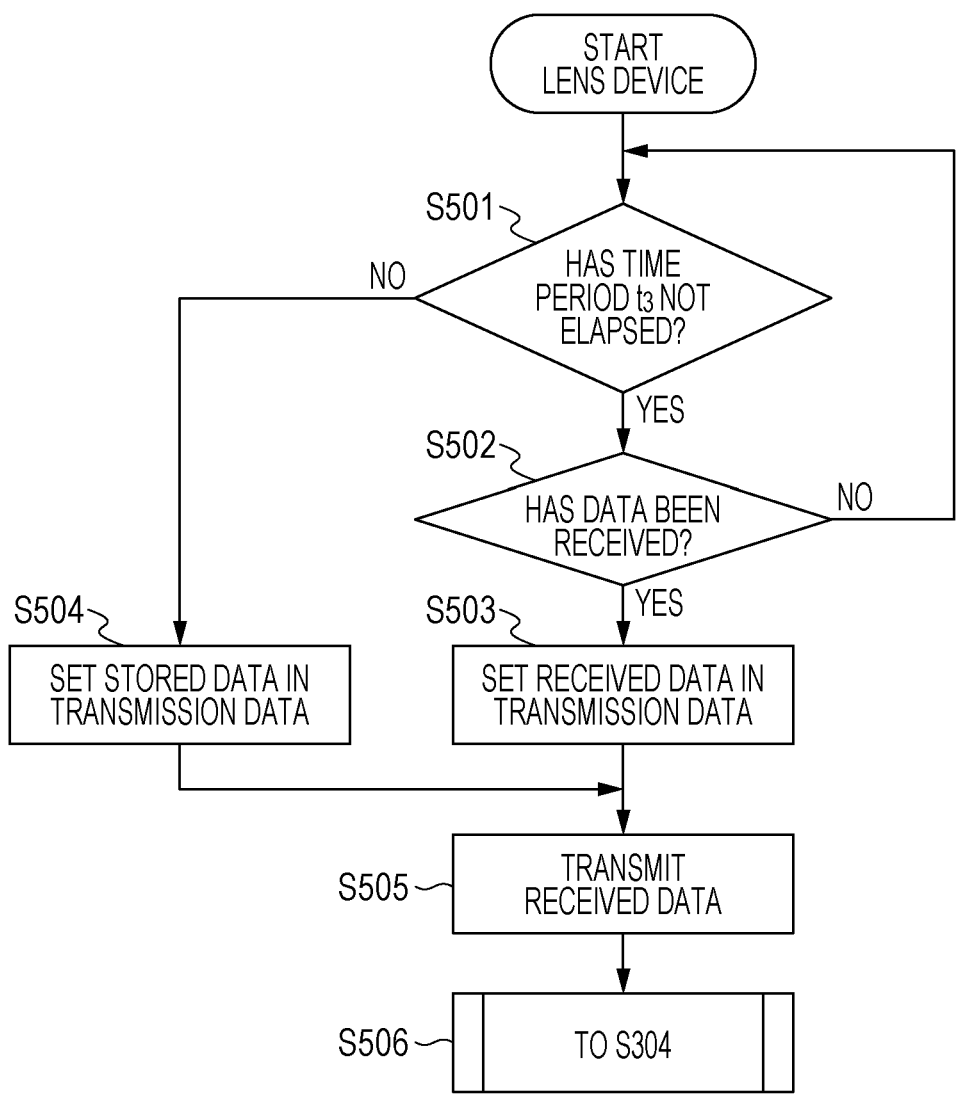
FIG. 5 is a flowchart related to a lens device of the second embodiment (when the lens device is turned on).

FIG. 5 is a flowchart illustrating a communication process of this embodiment carried out by the lens device 200 when the lens device 200 is turned on. In this embodiment, it is assumed that the position detection device 100 is turned off and the lens device 200 is in a low-power-consumption state.

The lens device 200 proceeds to step S501 after being started.

In S501, the lens device 200 determines whether the time period $t_3$ has not elapsed since the lens device 200 has been started. In the case where the time period $t_3$ has not elapsed, the lens device 200 proceeds to step S502; otherwise, the lens device 200 proceeds to step S504.

In step S502, the lens device 200 determines whether information (data) has been input by the position detection device 100. In the case where information (data) has been input, the lens device 200 proceeds to step S503; otherwise, the lens device 200 returns to step S501.

In step S503, the lens device 200 sets (includes) the position information (position data) detected in step S502, in output data to be output to the camera device 300 and proceeds to step S505.

In step S504, the lens device 200 sets (includes) the position information (position data) stored in the memory L 207, in output data to be output to the camera device 300 and proceeds to step S505.

In step S505, the lens device 200 outputs the output data to the camera device 300 and proceeds to step S506.

In step S506, the lens device 200 proceeds to step S304 in FIG. 3B.

With the above configuration, the lens device 200 is capable of outputting position information (position data) to the camera device 300 before the end of the camera image-capturing start period even when position information (position data) is not input by the position detection device 100. This enables the camera device 300 to quickly reach the state of being able to start capturing an image after the lens device 200 has been started, even when the position detection device 100 is turned off.

In this embodiment, a description is given assuming that a given lens position is stored as the position information (position data) in the memory L 207 of the lens device 200. However, a lens position may regularly be stored in the memory L 207, or a lens position may be stored in the memory L 207 when the lens device 200 is turned off.

According to this embodiment, it is possible to provide such an image capturing system, in which the lens system can promptly output position information (position data) to the camera device 300 after the lens device 200 has been started.

Third Embodiment

An image capturing system according to a third embodiment of the present invention is described below with reference to FIGS. 6, 7A, and 7B.

The same functional components as those of Embodiments 1 and 2 are denoted by the same numerals, and the description thereof is omitted.

Figure 6:
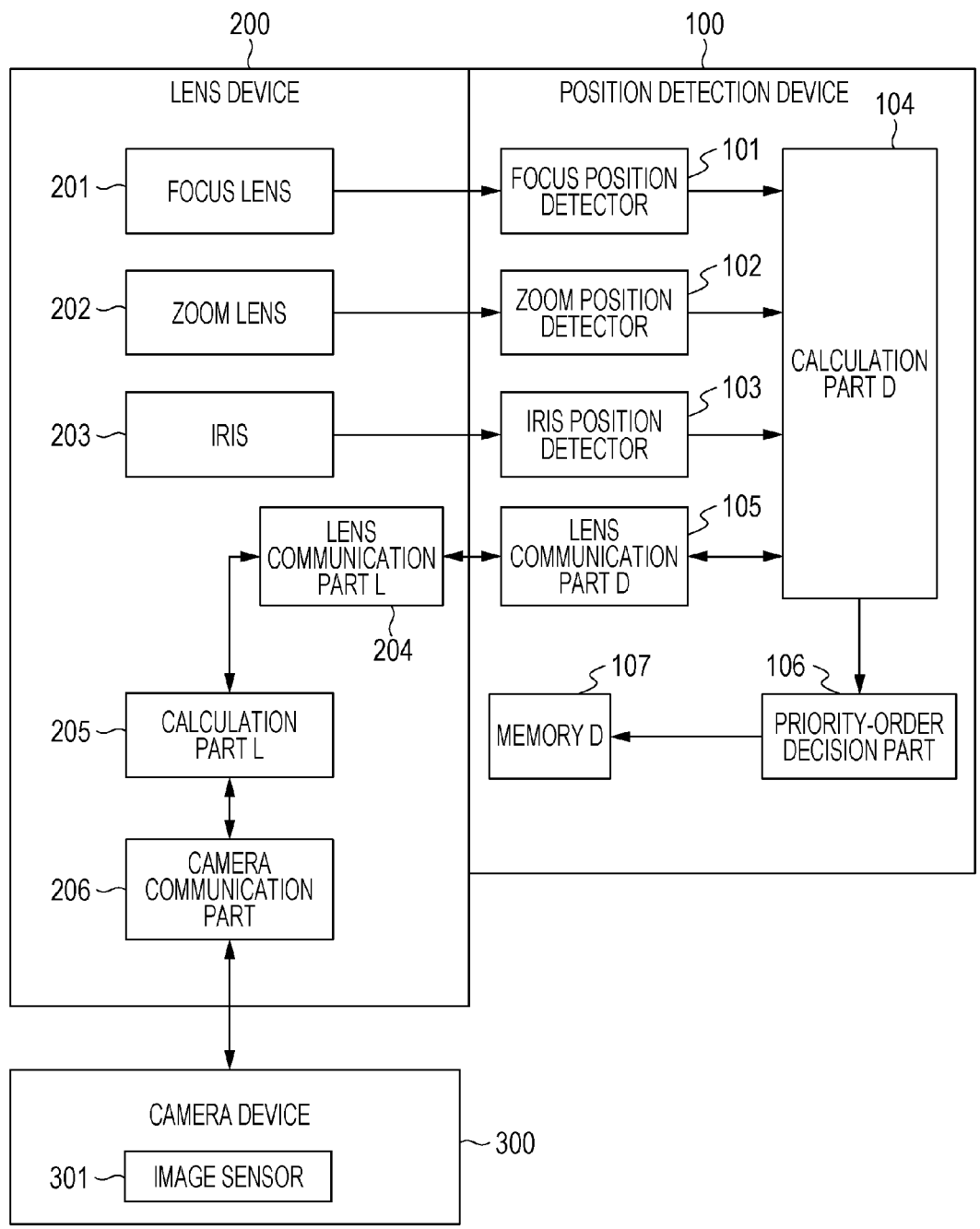
FIG. 6 is a block diagram illustrating a configuration according to a third embodiment.

FIG. 6 is a functional block diagram of the image capturing system of this embodiment. FIG. 6 is different from FIG. 1 used in the first embodiment in that the position detection device 100 further includes a priority-order decision part 106 and a memory D 107.

The priority-order decision part 106 decides upon the order of priority for position information (position data) to be included in first communication data to be output before communication with the lens device 200 (first communication path) is established, on the basis of the setting of the position detection device 100 stored in the memory D 107.

The memory D 107 is a nonvolatile memory. In this embodiment, it is assumed that the lens device 200 is a fixed focal length lens and the memory D 107 stores the setting for prime lens in advance.

FIGS. 7A and 7B are flowcharts illustrating communication processes of this embodiment carried out by the position detection device 100 and the lens device 200 when the lens device 200 is turned on. FIG. 7A illustrates the communication process by the position detection device 100. FIG. 7B illustrates the communication process by the lens device 200. Since FIG. 7B is the same as FIG. 3B, the description of FIG. 7B is omitted. In this embodiment, the lens device 200 is assumed to be in a low-power-consumption state.

The position detection device 100 proceeds to step S701 when a connection for communication with the lens device 200 is not established.

In step S701, the position detection device 100 reads out the lens setting from the memory D 107 and proceeds to step S702.

In step S702, the priority-order decision part 106 decides upon the position information (position data) to be included in the first communication data on the basis of the lens setting read out in step S701, and the position detection device 100 proceeds to step S301. Since the lens device 200 is a prime lens in this embodiment, the priority-order decision part 106 gives high priority to focus lens position and iris position as position information (position data).

With this configuration, the priority order for information (data) to be output to the lens device 200 by the position detection device 100 can be changed. This makes it possible to output optimal information (data) to the camera device 300 before the end of the camera image-capturing start period according to the type of lens. For example, when a prime lens is used, high priority is given to iris position and focus position than that to zoom position; when a lens with an extender is used, high priority is given to the state of the extender.

In this embodiment, the lens setting is stored in the position detection device 100 in advance in order to decide upon the order of priority for position information (position data) to be included in the first communication data. However, the position detection device 100 may detect and store the type of connected lens. A description is given above assuming that the lens device 200 is a prime lens. However, since optimal data is included in the first communication data according to the type of lens, this embodiment is applicable to various types of lenses such as a lens with an extender, an auto-focus lens, and a lens with a stabilization function.

According to this embodiment, it is possible to provide such an image capturing system, in which a lens system can promptly output position information (position data) to the camera device 300 after the lens device 200 has been started.

Fourth Embodiment

An image capturing system according to a fourth embodiment of the present invention is described below with reference to FIGS. 8, 9A, 9B, 10A, and 10B.

The same functional components as those of Embodiments 1 to 3 are denoted by the same numerals, and the description thereof is omitted.

Figure 8:
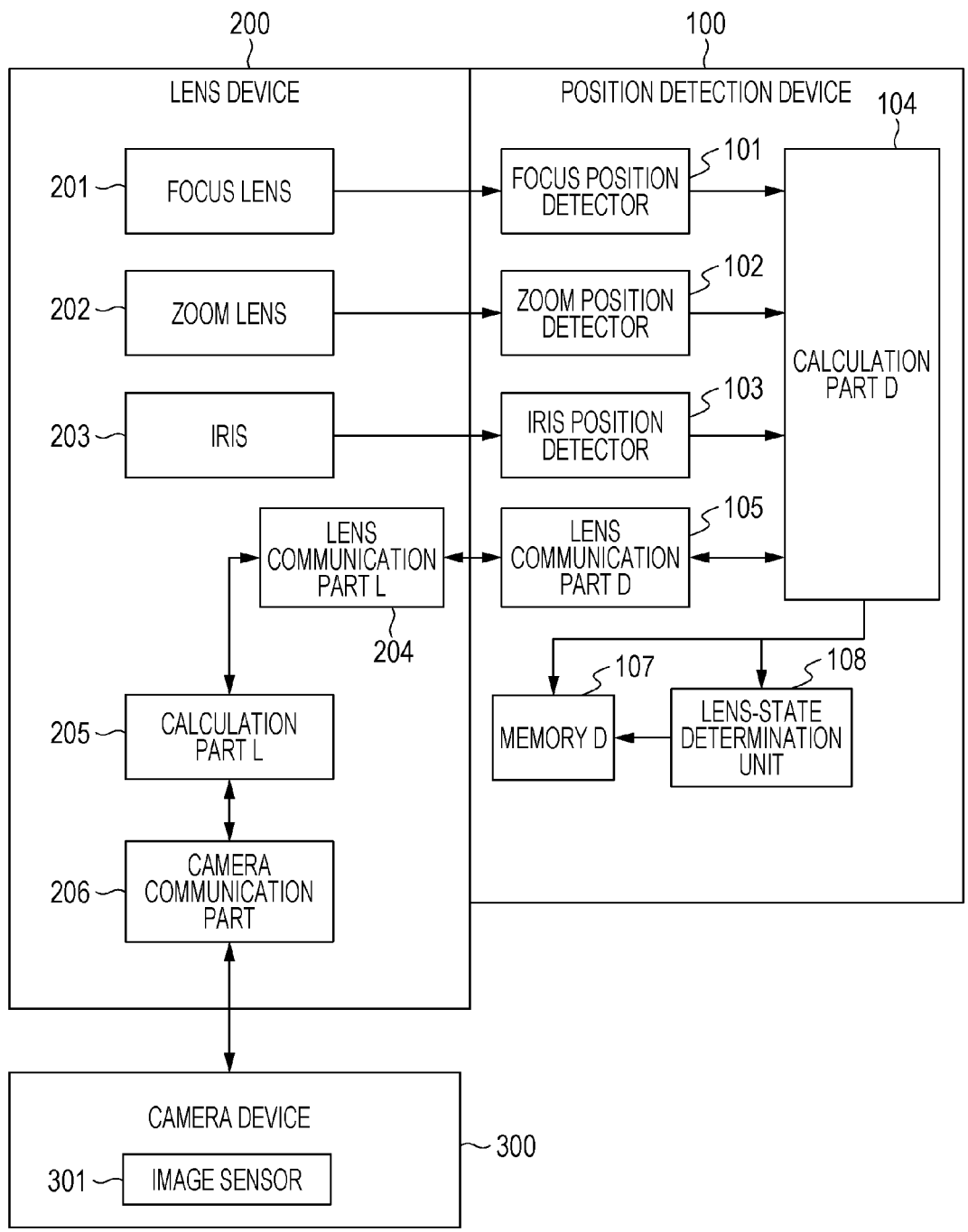
FIG. 8 is a block diagram illustrating a configuration according to a fourth embodiment.

FIG. 8 is a functional block diagram of the image capturing system of this embodiment. FIG. 8 is different from FIG. 1 used in the first embodiment in that the position detection device 100 further includes a memory D 107 and a lens-state determination part 108.

In this embodiment, the memory D 107 is a nonvolatile memory and stores the state of the lens device 200. In this embodiment, the state of the lens device 200 is a state A when being in a low-power-consumption state and is a state B when being in a power-off state.

The lens-state determination part 108 determines the lens state on the basis of the state of the lens device 200 stored in the memory D 107.

The calculation part D 104 stores the state of the lens device 200 input by the lens communication part D 105, in the memory D 107. In addition, position information (position data) to be included in first communication data is set on the basis of the determination result from the lens-state determination part 108.

In this embodiment, position information (position data) of the lens device 200 is set to be included in the first communication data when the lens device 200 is started from the state A. In contrast, when the lens device 200 is started from the state B, only a connection command as a connection request signal is set in the first communication data without including position information (position data).

In other words, the position detection device 100 establishes communication (first communication path) with the lens device 200 by using a connection request signal including lens position data when desiring to establish the connection quickly after the lens device 200 has been started. Otherwise, the position detection device 100 establishes the communication (first communication path) by using a connection command as a connection request signal (without including lens position data).

Figure 9A:
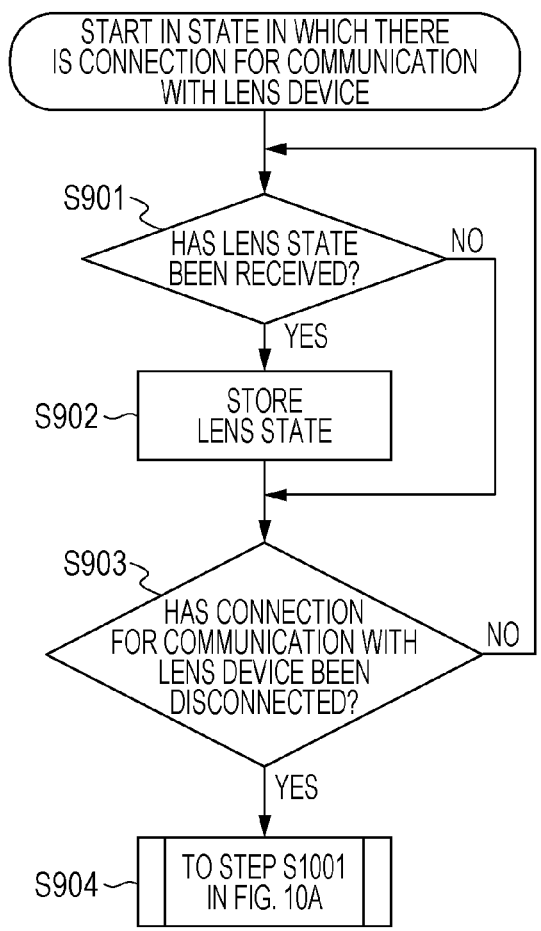
FIGS. 9A and 9B are respectively a flowchart related to a position detection device and a flowchart related to a lens device of the fourth embodiment (when the lens device is to enter an OFF state).
Figure 9B:
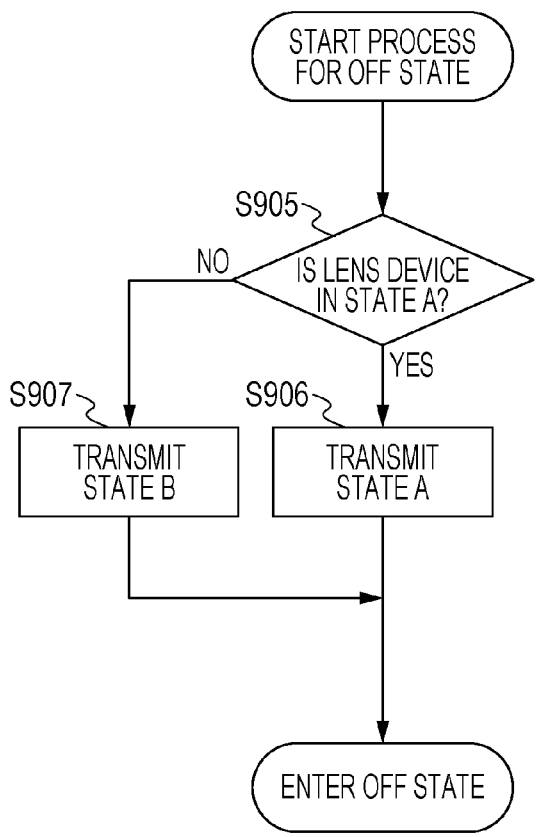

FIGS. 9A and 9B are flowcharts illustrating communication processes of this embodiment carried out by the position detection device 100 and the lens device 200 when the lens device 200 is to enter the state A or the state B. FIG. 9A illustrates the communication process by the position detection device 100. FIG. 9B illustrates the communication process by the lens device 200. In this embodiment, the lens device 200 is assumed to enter the state A or the state B.

First, a description is given with reference to FIG. 9A.

The position detection device 100 proceeds to step S901 in a state where a connection for communication with the lens device 200 has been established. In step S901, the position detection device 100 determines whether a lens state has been input by the lens device 200. In the case where a lens state has been input, the position detection device 100 proceeds to step S902; otherwise, the position detection device 100 proceeds to step S903.

In step S902, the lens state detected in step S901 is stored in the memory D 107.

In step S903, the position detection device 100 determines whether a connection for communication with the lens device 200 has been disconnected. In the case where the connection has been disconnected, the position detection device 100 proceeds to step S904; otherwise, the position detection device 100 returns to step S901.

In step S904, the position detection device 100 proceeds to step S1001 to be described with reference to FIG. 10A.

Next, a description is given with reference to FIG. 9B.

When the process for causing the lens device 200 to enter an OFF state is carried out, the lens device 200 proceeds to step S905.

In step S905, the lens device 200 determines whether the lens device 200 is in the state A. In the case where the lens device 200 is in the state A, the lens device 200 proceeds to step S906; otherwise, the lens device 200 proceeds to step S907.

In step S906, the lens device 200 outputs information indicating the state A to the position detection device 100 and enters the state A.

In step S907, the lens device 200 outputs information indicating the state B to the position detection device 100 and enters the state B.

Figure 10A:
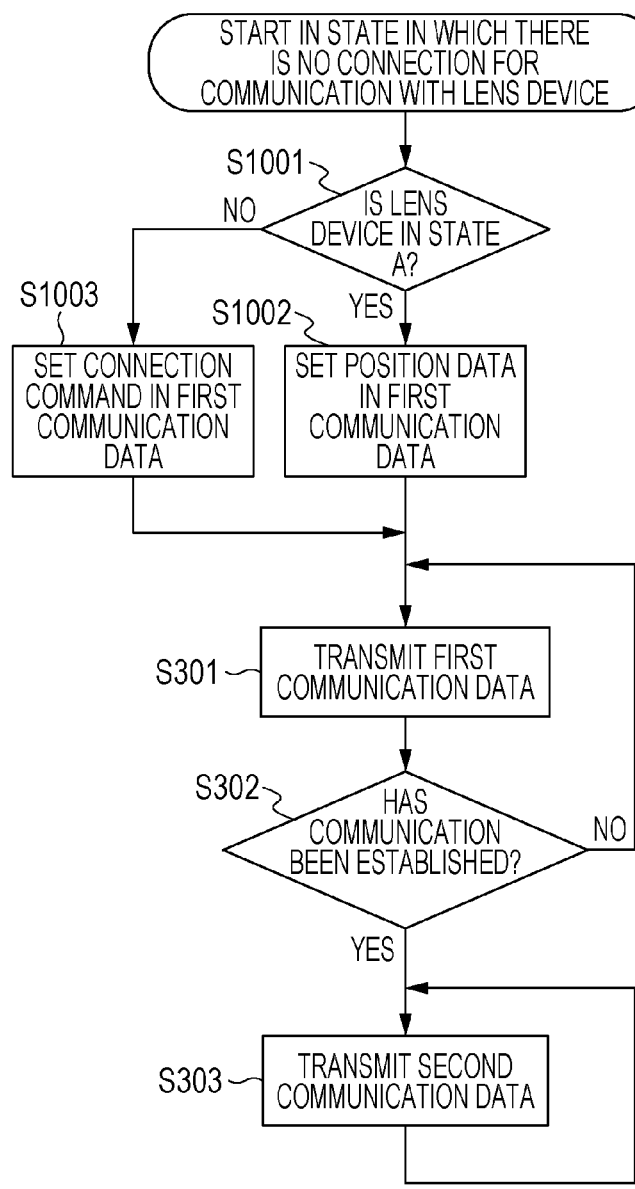
FIGS. 10A and 10B are respectively a flowchart related to the position detection device and a flowchart related to the lens device of the fourth embodiment (when the lens device is turned on).
Figure 10B:
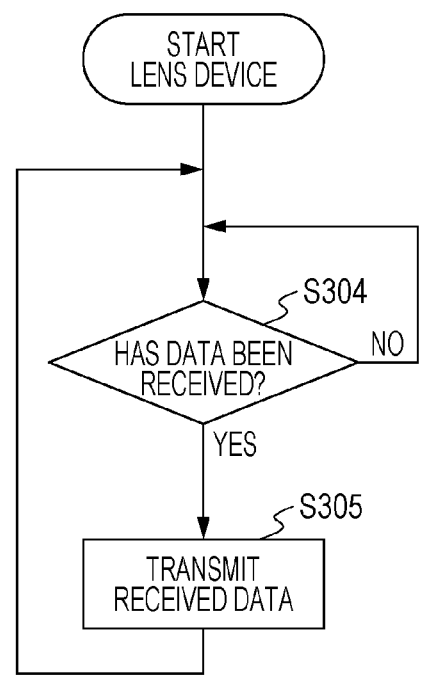

FIGS. 10A and 10B are flowcharts illustrating communication processes carried out by the position detection device 100 and the lens device 200 when the lens device 200 is turned on after a connection for communication between the position detection device 100 and the lens device 200 has been disconnected through the processes in FIGS. 9A and 9B. FIG. 10A illustrates the communication process by the position detection device 100. FIG. 10B illustrates the communication process by the lens device 200. Since FIG. 10B is the same as FIG. 3B, the description of FIG. 10B is omitted.

The position detection device 100 proceeds to step S1001 when a connection for communication with the lens device 200 is not established (step S904).

In step S1001, the lens-state determination part 108 determines whether the lens device 200 is in the state A. In the case where the lens device 200 is in the state A, the position detection device 100 proceeds to step S1002; otherwise, the position detection device 100 proceeds to step S1003.

In step S1002, the position detection device 100 makes setting so as to include lens position data in the first communication data and proceeds to step S301.

In step S1003, the position detection device 100 makes setting so as to include a connection command as a connection request signal (not including lens position data) in the first communication data and proceeds to step S301.

With this configuration, the first communication data can be changed according to the state of the lens device 200. This makes it possible to change information to be included in the first communication data depending on whether it is desirable to quickly establish communication, for example, when the lens device 200 is started from the low-power-consumption state, or is in some other situation. For example, when the position detection device 100 does not need to quickly establish communication, communication can be established through an initial connection process using, for example, a connection command, whereby the CPU load at the time of starting the lens device 200 can be reduced.

In this embodiment, the case of starting the lens device from the power-off state (state B) is given as an example of the case where the position detection device 100 does not need to quickly establish communication. However, the case is not limited to this, and the position detection device 100 may set for each case whether it is necessary to quickly establish communication.

According to this embodiment, it is possible to provide such an image capturing system, in which the lens system can promptly output position information (position data) to the camera device 300 after the lens device 200 has been started.

Exemplary embodiments of the present invention are described above. However, the present invention is not limited to the above embodiments, and various changes and modifications can be made within the gist of the present invention. For example, the position detection device 100 may output a position signal including position information to the lens device 200 after the position detection device 100 has output a connection request signal not including position data to the lens device 200 and before a first communication path is established. Although the timing at which the lens system outputs position information to the camera device 300 is slightly delayed in such a configuration compared to the configuration in which a connection request signal includes position information, approximately the same effects can be obtained in both configurations.

According to an aspect of the present invention, it is possible to provide a lens system and an image capturing system that are capable of promptly obtaining position information regarding an optical member after a lens device has been started.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-077896, filed Apr. 4, 2014, which is hereby incorporated by reference herein in its entirety.

What is claimed is:

1. A lens system comprising:
   a lens device including an optical member; and
   a position detection device including a detection unit that obtains position information regarding the optical member,
   wherein the position detection device includes a generation unit that generates a connection request signal for requesting the lens device to establish a first communication path between the lens device and the position detection device, and
   wherein the connection request signal generated by the generation unit includes the position information obtained by the detection unit.

2. The lens system according to claim 1,
wherein the position detection device includes a first output unit that outputs the connection request signal to the lens device, and
wherein a first time period in which the first output unit outputs the connection request signal to the lens device is set so as to be shorter than a second time period from when the lens device is started to when a second communication path between the lens device and a camera device is established.

3. The lens system according to claim 2,
wherein the lens device includes
a memory that stores the position information and
a second output unit that outputs the position information to a camera device, and
wherein the second output unit outputs position information stored in the memory to the camera device when the connection request signal is not input to the lens device before a third time period elapses after the lens device has been started, the third time period being shorter than the first time period.

4. The lens system according to claim 2, wherein the position detection device includes a decision unit that decides upon the position information to be output to the lens device by the first output unit.

5. The lens system according to claim 1, wherein the position information includes at least one of information on an optical-axis-direction position of a zoom lens, information on an optical-axis-direction position of a focus lens, and information on a position of a diaphragm blade of an iris.

6. The lens system according to claim 1,
wherein the position detection device includes a determination unit that determines a state of the lens device, and
wherein the generation unit includes the position information in the connection request signal on the basis of the determination made by the determination unit.

7. The lens system according to claim 6, wherein the state is determined based on a time to be spent on establishing the first communication path.

8. The lens system according to claim 6, wherein the state includes a state in which power consumption is low.

9. A lens system comprising:
a lens device including an optical member; and
a position detection device including a detection unit that obtains position information regarding the optical member,
wherein the position detection device includes
a generation unit that generates a connection request signal for requesting the lens device to establish a first communication path between the lens device and the position detection device and
a first output unit that outputs the connection request signal to the lens device, and
wherein the first output unit outputs, to the lens device, a position signal including the position information obtained by the detection unit, after the connection request signal generated by the generation unit has been output and before the first communication path is established.

10. An image capturing system comprising:
a lens device including an optical member;
a position detection device including a detection unit that obtains position information regarding the optical member; and
a camera device including an image sensor that photoelectrically converts an optical image formed by the optical member,
wherein the position detection device includes a generation unit that generates a connection request signal for requesting the lens device to establish a first communication path between the lens device and the position detection device, and
wherein the connection request signal generated by the generation unit includes the position information obtained by the detection unit.

11. An image capturing system comprising:
a lens device including an optical member;
a position detection device including a detection unit that obtains position information regarding the optical member; and
a camera device including an image sensor that photoelectrically converts an optical image formed by the optical member,
wherein the position detection device includes
a generation unit that generates a connection request signal for requesting the lens device to establish a first communication path between the lens device and the position detection device and
a first output unit that outputs the connection request signal to the lens device, and
wherein the first output unit outputs, to the lens device, a position signal including the position information obtained by the detection unit, after the connection request signal generated by the generation unit has been output and before the first communication path is established.

* * * * *